(12) United States Patent
Bisht et al.

(10) Patent No.: US 12,470,611 B2
(45) Date of Patent: Nov. 11, 2025

(54) SYSTEM AND METHOD FOR MAPPING SESSION INITIATION PROTOCOL RESPONSE WITH A CAUSE CODE

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Rohit Soren, District-Dumka (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,518

(22) PCT Filed: Mar. 11, 2023

(86) PCT No.: PCT/IB2023/052350
§ 371 (c)(1),
(2) Date: Mar. 31, 2023

(87) PCT Pub. No.: WO2023/187517
PCT Pub. Date: Oct. 5, 2023

(65) Prior Publication Data
US 2025/0055889 A1    Feb. 13, 2025

(30) Foreign Application Priority Data
Mar. 30, 2022   (IN) .............. 202221018945

(51) Int. Cl.
*H04L 12/00* (2006.01)
*H04L 65/1016* (2022.01)
(Continued)

(52) U.S. Cl.
CPC ...... *H04L 65/1104* (2022.05); *H04L 65/1016* (2013.01); *H04L 69/22* (2013.01)

(58) Field of Classification Search
CPC . H04L 65/1104; H04L 65/1016; H04L 69/22; H04L 65/1063; H04L 65/1045; H04L 65/1046
(Continued)

(56) References Cited

U.S. PATENT DOCUMENTS 9,137,369 B1    9/2015  Mammem
9,258,379 B2 *  2/2016  Jansson .................. H04L 67/562
(Continued)

FOREIGN PATENT DOCUMENTS

EP         3172880 A1      5/2017
WO      2019041747 A1      3/2019
(Continued)

OTHER PUBLICATIONS

G. Camarillo et al., "Integrated Services Digital Network (ISDN) User Part (ISUP) to Session Initiation Protocol (SIP) Mapping", Network Working Group, RFC 3398, Nov. 2002, Total pp. 68.
(Continued)

*Primary Examiner* — Frantz Coby
(74) *Attorney, Agent, or Firm* — FINNEGAN, HENDERSON, FARABOW, GARRETT & DUNNER LLP

(57) ABSTRACT

The present disclosure generally relates to message processing in communication systems, more particularly to systems and methods for mapping Session Initiation Protocol (SIP) response with appropriate cause code. BTAS receives SIP response, and determines reason for error in call, and cause code for error. BTAS maps SIP and appropriate cause code. BTAS provides, in SIP response, appropriate reason for call failure or call error. Call is sent to E-SBC, routed from E-SBC to P-CSCF, and routed from P-CSCF to S-CSCF. A query is sent from S-CSCF to DNC server regarding DNC registration of B number. DNC server answers, if B number (Continued)

is registered/Non-registered for DNC. Call is forwarded to BTAS, and query is sent from BTAS to MNP. BTAS routes call to S-CSCF. Wireline calls to terminating BTAS, in which VOLTE calls to TAS, and offnet calls to MGCF via BGCF. Offnet calls is sent from BGCF to MGCF.

20 Claims, 6 Drawing Sheets

(51) Int. Cl.
*H04L 65/1104* (2022.01)
*H04L 69/22* (2022.01)
(58) Field of Classification Search
USPC .......................................... 370/352
See application file for complete search history.

(56) References Cited

U.S. PATENT DOCUMENTS

2006/0015647 A1* 1/2006 Kang ................. H04L 65/1104
709/245
2009/0106437 A1* 4/2009 Mostafa ................ H04L 61/301
709/230
2010/0091768 A1* 4/2010 Gilbert ................ H04M 7/0075
370/352
2011/0216762 A1* 9/2011 Nas ..................... H04M 7/0075
370/352
2017/0111404 A1 4/2017 Noldus
2021/0135954 A1 5/2021 Boyle et al.
2021/0185132 A1 6/2021 Zhang et al.

FOREIGN PATENT DOCUMENTS

WO 2020014575 A1 1/2020
WO WO-2023187517 A1 * 10/2023 ............. H04L 69/22

OTHER PUBLICATIONS

R. Jesske et al., "Carrying Q.850 Codes in Reason Header Fields in SIP (Session Initiation Protocol) Responses", Internet Engineering Task Force (IETF), RFC 6432, Nov. 2011, Total pp. 04.
International Search Report, PCT/IB2023/052350, mailed Aug. 3, 2023, Total pp. 03.

* cited by examiner

SYSTEM AND METHOD FOR MAPPING SESSION INITIATION PROTOCOL RESPONSE WITH A CAUSE CODE

RESERVATION OF RIGHTS

A portion of the disclosure of this patent document contains material, which is subject to intellectual property rights such as but are not limited to, copyright, design, trademark, integrated circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to message processing in communication systems. More particularly, the present disclosure relates to systems and methods for mapping Session Initiation Protocol (SIP) response with an appropriate cause code.

BACKGROUND OF INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

In general, a Session Initiation Protocol (SIP) may be based around request/response transactions, in a similar manner to a Hypertext Transfer Protocol (HTTP). Each transaction consists of a SIP request (which will be one of several request methods), and at least one response. The SIP responses specify a three-digit integer response code, which is one of a number of defined codes that detail the status of the request. These codes may be grouped according to their first digit as "provisional", "success", "redirection", "client error", "server error" or "global failure" codes, corresponding to a first digit of 1-6; these are expressed as, for example, "1xx" for provisional responses with a code of 100-199, and the like. The SIP responses also specify a "reason phrase", and a default reason phrase may be defined with each response code. These reason phrases can be varied, however, such as to provide additional information or to provide the text in a different language.

In addition, an auto dialer in a contact center setup may be able to read final error responses and associated Q.850 cause codes in a Session Initiation Protocol (SIP) reason header of a SIP message. However as most of the failure use cases are handled through announcement playback which results in an incorrect Q.850 cause code being sent under provisional responses 18X instead of final error responses. Final error responses may typically contain a dummy cause values corresponding to normal unspecified terminations.

There is, therefore, a need in the art to provide a system and a method that can mitigate the problems associated with the prior arts.

OBJECTS OF THE INVENTION

Some of the objects of the present disclosure, which at least one embodiment herein satisfies are listed herein below.

It is an object of the present disclosure to provide a system and method for mapping Session Initiation Protocol (SIP) response with an appropriate cause code.

It is an object of the present disclosure to provide a system and a method for changing a cause-code received in SIP reason header based on SIP Vs cause-code mapping. wherever it is required.

It is an object of the present disclosure to modify final SIP error responses as per user's requirement.

It is an object of the present disclosure to avoid final error responses containing a dummy cause values corresponding to normal unspecified terminations.

It is an object of the present disclosure to help in deriving analytical data based on the combination of a SIP final error cause code and pre-defined cause codes. Based on the analytical data, the user derives a call re-dial strategy to improve on success ratio.

It is an object of the present invention to enhance the overall communication system.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for mapping a Session Initiation Protocol (SIP) response code with a cause code. The system may include a processor and a memory coupled to the processor. The memory may include executable instructions to be executed by the processor. The processor may receive, in response to a SIP request message, a SIP response message. The SIP response message may correspond to at least one of a provisional SIP response message and a final SIP response message. The processor may determine at least one of a pre-defined cause code in a reason header field associated with said at least one of the provisional SIP response message and the final SIP response message, and an error response code in a reason header field associated with the final SIP response message. The processor may, in response to the determination of the pre-defined cause code in the final SIP response message, modify the pre-defined cause code in the reason header field associated with the final SIP response message based on the pre-defined cause code in the reason header field associated with the provisional SIP response message. The processor may, in response to the determination of the error response code in the final SIP response message, modify the error response code in the reason header field associated with the final SIP response message, based on the pre-defined cause code in the reason header field associated with the provisional SIP response message. The processor may map the pre-defined cause code in the final SIP response message with a corresponding SIP response code. The processor may provide the final SIP response message with the mapped SIP response code and a reason message associated with the SIP response code.

In an embodiment, the pre-defined cause code may be a Q.850 cause code in the reason header field associated with said at least one of the provisional SIP response message and the final SIP response message.

In an embodiment, to determine the at least one of the pre-defined cause code in the reason header field associated with said at least one of the provisional SIP response message and the final SIP response message, the processor may replicate the pre-defined cause code from the reason header field associated with the provisional SIP response message in the reason header field associated with the final SIP response message based on the pre-defined cause code being present in the provisional SIP response message and the pre-defined cause code not being present in the final SIP response message. The processor may modify the error response code in the reason header field associated with the final SIP response message based on the pre-defined cause code in the reason header field associated with the final SIP response message.

In an embodiment, to determine the at least one of the pre-defined cause code in the reason header field associated with said at least one of the provisional SIP response message and the final SIP response message, the processor may modify the error response code in the reason header field associated with the final SIP response message based on the pre-defined cause code in the reason header field associated with the final SIP response message, when the pre-defined cause code is not present in the provisional SIP response message and the pre-defined cause code is present in the final SIP response message.

In an embodiment, to determine the at least one of the pre-defined cause code in the reason header field associated with said at least one of the provisional SIP response message and the final SIP response message, the processor may insert the pre-defined cause code in the reason header field associated with the final SIP response message based on the error response code received in the reason header field associated with the final SIP response message, when the pre-defined cause code is not present in the provisional SIP response message and the final SIP response message.

In an embodiment, the BTAS may include an SIP trunk infrastructure to support an out dialer service for a call associated with the SIP request message.

In an embodiment, the processor may transmit the call from the out-dialer service to a Do Not Call (DNC) server communicatively coupled to the BTAS. Further, the processor may receive a status message based on a number associated with the call being listed in a Do Not Disturb (DND) database, where the call may be terminated at the DNC server, based on the number associated with the call being listed in the DND database. The processor may be configured to receive a routed call from the DNC server to the BTAS for mapping the SIP response code with the cause code In an embodiment, the pre-defined cause code may correspond to at least one of an Integrated Services Digital Network (ISDN) User Part (ISUP) cause value, and a failure-related cause value.

In an embodiment, mapping of the pre-defined cause code in the final SIP response message with the corresponding SIP response code may be based on a pre-defined cause code-SIP response code mapping table.

In an aspect, the present disclosure relates to a method for mapping SIP response with a cause code. The method may include receiving, by a processor associated with a Business Telephony Application Server (BTAS) in response to a SIP request message, a SIP response message. The SIP response message may correspond to at least one of a provisional SIP response message and a final SIP response message. The method may include determining, by the processor, at least one of a pre-defined cause code in a reason header field associated with at least one of the provisional SIP response message and the final SIP response message, and an error response code in a reason header field associated with the final SIP response message. The method may include modifying, by the processor, in response to determining the pre-defined cause code e in the final SIP response message, the pre-defined cause code in the reason header field associated with the final SIP response message based on the pre-defined cause code in the reason header field associated with the provisional SIP response message. The method may include modifying, by the processor, in response to determining the error response code in the final SIP response message, the error response code in the reason header field associated with the final SIP response message based on the pre-defined cause code in the reason header field associated with the provisional SIP response message. The method may include mapping, by the processor, the pre-defined cause code in the final SIP response message with a corresponding SIP response code. The method may include providing, by the processor, the final SIP response message with the mapped SIP response code and a reason message associated with the SIP response code.

In an embodiment, the pre-defined cause code may be a Q.850 cause code in the reason header field associated with said at least one of the provisional SIP response message and the final SIP response message.

In an embodiment, for determining the at least one of the pre-defined cause code in the reason header field associated with said at least one of the provisional SIP response message and the final SIP response message, the method may include replicating, by the processor, the pre-defined cause code from the reason header field associated with the provisional SIP response message, in the reason header field associated with the final SIP response message, based on the pre-defined cause code being present in the provisional SIP response message and the pre-defined cause code not being present in the final SIP response message. The method may include modifying, by the processor, the error response code in the reason header field associated with the final SIP response message, based on the pre-defined cause code in the reason header field associated with the final SIP response message.

In an embodiment, for determining the at least one of the pre-defined cause code in the reason header field associated with said at least one of the provisional SIP response message and the final SIP response message, the method may include modifying, by the processor, the error response code in the reason header field associated with the final SIP response message, based on the pre-defined cause code in the reason header field associated with the final SIP response message when the pre-defined cause code is not present in the provisional SIP response message and the pre-defined cause code is present in the final SIP response message.

In an embodiment, for determining the at least one of the pre-defined cause code in the reason header field associated with said at least one of the provisional SIP response message and the final SIP response message, the method may include modifying, by the processor, the error response code in the reason header field associated with the final SIP response message, based on the pre-defined cause code in the reason header field associated with the final SIP response message, when the pre-defined cause code not being present in the provisional SIP response message and the pre-defined cause code being present in the final SIP response message.

In an embodiment, the BTAS may include an SIP trunk infrastructure to support an out dialer service for a call associated with the SIP request message.

In an embodiment, for determining the at least one of the pre-defined cause code in the reason header field associated with said at least one of the provisional SIP response message and the final SIP response message, the method may include inserting, by the processor, the pre-defined cause code in the reason header field associated with the final SIP response message based on the error response code received in the reason header field associated with the final SIP response message, based on the pre-defined cause code not being present in the provisional SIP response message and the final SIP response message.

In an embodiment, the BTAS may include an SIP trunk infrastructure to support an out dialer service for a call associated with the SIP request message.

In an embodiment, the method may include transmitting, by the processor, the call from the outdialer service to a Do Not Call (DNC) server communicatively coupled to the BTAS. The method may include receiving, by the processor, a status message based on a number associated with the call not being listed in a Do Not Disturb (DND) database. The call may be terminated at the DNC server based on the number associated with the call being listed in the DND database. The method may include receiving, by the processor, a routed call from the DNC server to the BTAS for mapping the SIP response code with the cause code.

In an embodiment, the pre-defined cause code may correspond to at least one of an Integrated Services Digital Network (ISDN) User Part (ISUP) cause value, and a failure-related cause value.

In an embodiment, the method may include mapping the pre-defined cause codein the final SIP response message with the corresponding SIP response code based on a pre-defined cause code-SIP response code mapping table.

In an aspect, the present disclosure relates to a User Equipment (UE) for mapping an SIP response code with an appropriate cause code. The UE may include one or more processors coupled to a processor of a Business Telephony Application Server (BTAS). The one or more processors may be coupled to a memory that may store executable instructions to be executed by the one or more processors which may cause the UE to transmit a SIP response message to the BTAS. The one or more processors may be configured to receive, in response to a SIP request message, the SIP response message from the UE. The SIP response message may correspond to at least one of a provisional SIP response message and a final SIP response message. The one or more processors may determine at least one of a pre-defined cause code in a reason header field associated with said at least one of the provisional SIP response message and the final SIP response message, and an error response code in a reason header field associated with the final SIP response message. The one or more processor may, in response to the determination of the pre-defined cause code in the final SIP response message, modify the pre-defined cause code in the reason header field associated with the final SIP response message based on the pre-defined cause code in the reason header field associated with the provisional SIP response message. The one or more processors may, in response to the determination of the error response code in the final SIP response message, modify the error response code in the reason header field associated with the final SIP response message, based on the pre-defined cause code in the reason header field associated with the provisional SIP response message. The one or more processor may map the pre-defined cause code in the final SIP response message with a corresponding SIP response code. The one or more processors may provide the final SIP response message with the mapped SIP response code and a reason message associated with the SIP response code.

In an aspect, a non-transitory computer readable medium may include a processor with executable instructions that may cause the processor to receive, in response to a SIP request message, a SIP response message. The SIP response message may correspond to at least one of a provisional SIP response message and a final SIP response message. The processor may determine at least one of a pre-defined cause code in a reason header field associated with said at least one of the provisional SIP response message and the final SIP response message, and an error response code in a reason header field associated with the final SIP response message. The processor may in response to the determination of the pre-defined cause code in the final SIP response message, modify the pre-defined cause code in the reason header field associated with the final SIP response message based on the pre-defined cause code in the reason header field associated with the provisional SIP response message. The processor may map the pre-defined cause code in the final SIP response message with a corresponding SIP response code. The processor may provide the final SIP response message with the mapped SIP response code and a reason message associated with the SIP response code.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1A:
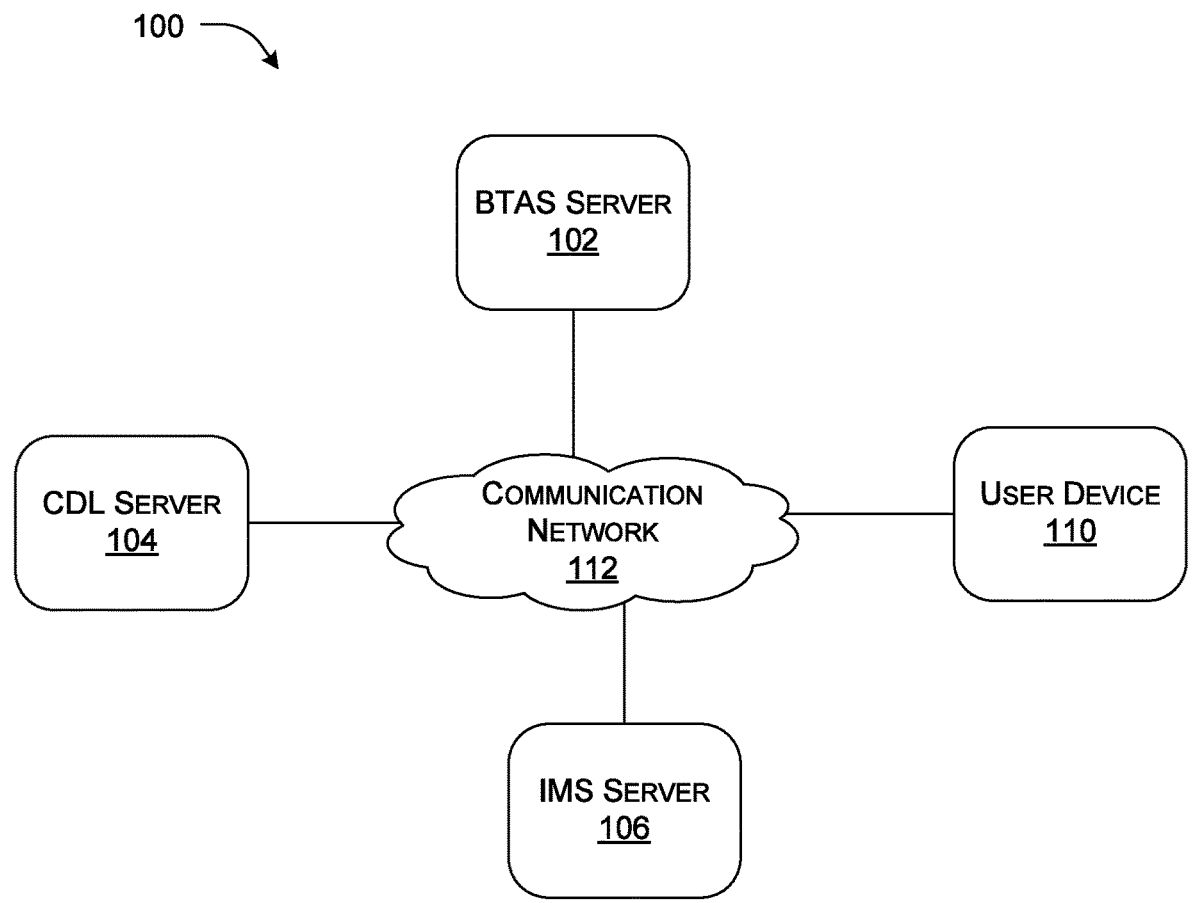
FIGS. 1A and 1B illustrate exemplary network architectures 100, 150 of a proposed system, in accordance with an embodiment of the present disclosure.

The foregoing shall be more apparent from the following more detailed description of the disclosure.

BRIEF DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The various embodiments throughout the disclosure will be explained in more detail with reference to FIGS. 1-5.

Figure 1B:
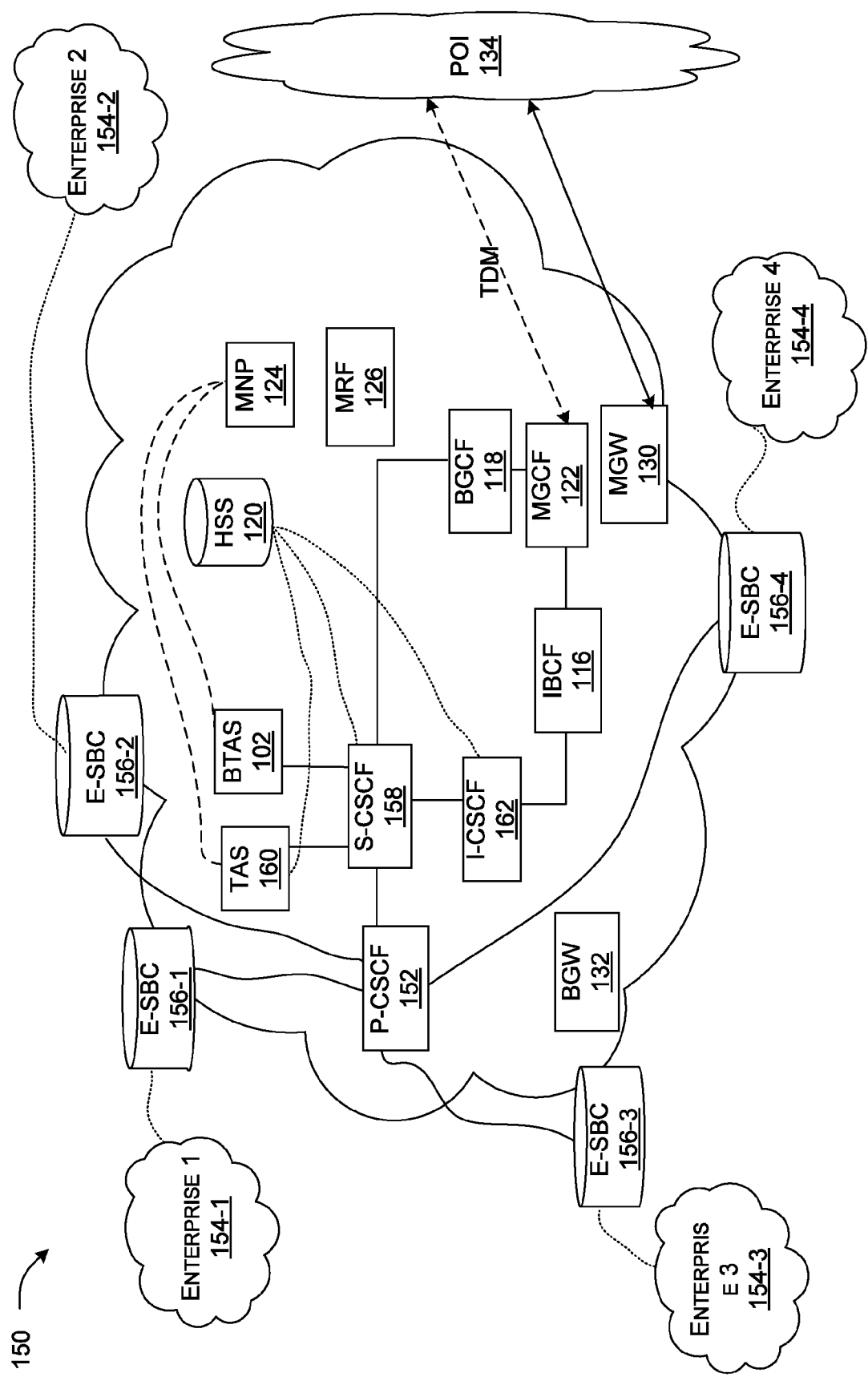

FIGS. 1A-1B illustrate exemplary network architecture 100 and 150 of a proposed system, in accordance with an embodiment of the present disclosure. As illustrated in representation 100 in FIG. 1A, a network device 102 (network device hereinafter interchangeably referred to as Business Telephony Application Server or BTAS 102) may be configured to facilitate to map Session Initiation Protocol (SIP) response with an appropriate cause code. The network device 102 may be configured as an application server and may be communicably operational or may be integrated with the Internet Protocol Multimedia Subsystem (IMS) server 106 (also interchangeably referred to as IMS or IMS core network 106). The IMS server 106 may pertain to a vendor or service provider to map SIP to appropriate cause code to a user device 110. In an embodiment, the BTAS 102 or the network device 102 may be implemented in an existing IMS implementation to facilitate network service corresponding to communication network 112. In an example, the communication network 112 may pertain to, for example, a Fourth Generation (4G), a Fifth Generation (5G) network service, or a Sixth Generation (6G) network service. In an embodiment, the BTAS/network device 102 may be communicatively coupled to a Do Not Call (DNC) server or framework 104 that may enable storing a number that is registered for "Do Not Disturb" (DND) service.

The user device 110 (also interchangeably referred to as a user equipment or UE or terminal 110) may be at least one of a wired device or wireless device. For example, the wired device may be a landline phone, a terminal device, or any other stationary device through which communication may be established. The wireless device may be a mobile device that may include, for example, a cellular telephone, such as a feature phone or smartphone and other devices. The user device 110 may not be limited to the above-mentioned devices, but may include any type of device capable of wired or wireless communication, such as a cellular phone, a tablet computer, a Personal Digital Assistant (PDA), a Personal Computer (PC), a laptop computer, a media center, a work station, and other such devices. In an embodiment, the user device may be at least one of the wireless or wireline devices that may be subscribed or registered to the network service provided by the service provider. In an example embodiment, the network service may pertain to the 4G/5G/6G network, wherein the service provider may provide the network service corresponding to at least one of a cellular network service, a private network service, a satellite network service, or a convergence network service. A person with ordinary skill in the art may understand that user device 110 may be interchangeably defined as user devices 110.

In an embodiment, the communication network 112 pertaining to BTAS 102 based IMS implementation may be the 4G/5G/6G network that may include at least one of a wireless network, a wired network, or a combination thereof. The communication network 112 may be implemented as one of the different types of networks, such as Intranet, Local Area Network (LAN), Wide Area Network (WAN), Internet, and the like. Further, the network can either be a dedicated network or a shared network. The shared network can represent an association of the different types of networks that can use a variety of protocols, for example, Hypertext Transfer Protocol (HTTP), Transmission Control Protocol/Internet Protocol (TCP/IP), Wireless Application Protocol (WAP), Automatic repeat request (ARQ), and the like. In an embodiment, the communication network 112 may pertain to the 4G/5G/6G network that may be facilitated through, for example, Global System for Mobile communication (GSM) network, a universal terrestrial radio network (UTRAN), an Enhanced Data rates for GSM Evolution (EDGE) radio access network (GERAN), an evolved universal terrestrial radio access network (E-UTRAN), a wireless fidelity (Wi-Fi) or other local area network (LAN) access network, or a satellite or terrestrial wide-area access network such as a wireless microwave access (WIMAX) network. In an example embodiment, the communication network may enable 4G/5G/6G network based on subscription pertaining to the user/user device and/or through a Subscriber Identity Module (SIM) card. Various other types of communication network or service may be possible.

In an example, the communication network 112 may utilize different sort of air interface, such as a code division multiple access (CDMA), time division multiple access (TDMA), or frequency division multiple access (FDMA) air interface and other implementation. In an example embodiment, the wireline user device may use wired access networks, exclusively or in combination with wireless access networks, for example, including Plain Old Telephone Service (POTS), Public Switched Telephone Network (PSTN), Asynchronous Transfer Mode (ATM), and other network technologies configured to transport Internet Protocol (IP) packets.

In reference to FIG. 1B, the network service (corresponding to 112 in FIG. 1A) may be provided to multiple entities or enterprises, such as, for example, enterprise-1 (154-1), enterprise-2 (154-2), enterprise-3 (154-3), and enterprise-4 (154-4) (collectively termed as enterprise 154). In an embodiment, at least one of the enterprises 154 may include an Internet Protocol Private Branch Exchange (IP-PBX) (not shown) to enable switching calls between user devices 110 on local lines. Each enterprise 154 may communicate with the communication network/servers through an Enterprise Session Border Controllers (E-SBC). As shown in FIG. 1B, each enterprise, for example, enterprise-1 (154-1), enterprise-2 (154-2), enterprise-3 (154-3), and enterprise-4 (154-4) may be facilitated with the network service (such as 4G/5G/6G network service) through an E-SBC 156-1, 156-2, 156-3 and 156-4 respectively. The E-SBC 156 may be an executable set of instructions for enabling connectivity and security pertaining to the network of the enterprises and service providers. The IP-PBX may be a private branch exchange or a telephone switching system within an enterprise, which may enable, for example, switching calls between users within an enterprise. In an embodiment, the BTAS 102 may be communicatively coupled with other components, such as, for example, IP telephone and provisioning servers. In an example embodiment, the IP-PBX may communicate with the E-SBC 154 via a Session Initiation Protocol (SIP) technique. The enterprise may pertain to an entity including, but not limited to, an organization, a company, a business, an educational campus, an office campus, a shopping center, a residential area/community, and various other entities that may wish to avail the communication network by the service provider. In an embodiment, the communication network may be available only within a pre-defined zone (allowed zone) of the enterprise. Various other types of entities/provisions are possible.

The IMS server (106 of FIG. 1A) may include one or more modules or components that may enable to perform one or more functions. For example, the IMS server 106 may be an existing IMS core including components/modules handling various functions such as, Serving-Call Session Control Function (S-CSCF) module 158, Interrogating-Call Session Control Function (I-CSCF) module 162, Proxy-Call Session Control Function (P-CSCF) module 152. In an embodiment, the BTAS 102 may be integrated with a network of the IMS core 106 and other application servers to provide a network service pertaining to, for example, 4G/5G/6G network. For example, the other application server may include a Telephony Application Server (TAS) 160, which may be considered as a general component used in a communication network to provide telephony applications and additional multimedia functions. In another example, the other application server may include Mobile Number Portability (MNP) server 124, which may provide number portability to users such as, for example, may allow retaining the same number upon a change in the service provider. Various other servers may be integrated into the BTAS 102 enabled IMS implementation for enabling one or more services pertaining to communication network or 4G/5G/6G network without departing from the scope of the ongoing description.

In reference to the components pertaining to the IMS, the S-CSCF module 158 may be a primary node in the IMS server 106 responsible for session control. In an embodiment, a list of subscribers may be allocated to respective S-CSCF module 158 at the time of IMS registration in order to facilitate routing of Session Initiation Protocol (SIP) messages as part of service establishment procedures. In operation, the S-CSCF module 158 may enable downloading a subscriber profile from a Home Subscriber Server (HSS) 120 at the time of IMS registration. The I-CSCF module 162 may be a key element in the IMS server and may enable any request to be routed to an appropriate S-CSCF module 158 from multiple S-CSCFs within the network. The I-CSCF module 162 may also interrogate the HSS 120 to obtain an address of the relevant S-CSCF module 158 to process a SIP initiation request. As shown in FIG. 1B, the P-CSCF module 152 may act as an ingress and egress point to and from an IMS domain of the service provider with respect to the IMS client. The P-CSCF module 152 may perform general functions, such as, for example, onward routing of registration and session requests to the correct nodes in the communication network, updating the S-CSCF module 158, maintaining a secure connection with the user device 110, and other such functions. In an embodiment, the network device or BTAS 102 may be communicatively coupled or be integrated with one or more functional components such as, for example, the Session Initiation Protocol (SIP) based application server. The SIP server may be built with features pertaining to the type enterprise 154.

Further, as shown in FIG. 1B, to provide various aspects of the network service (e.g., pertaining to 4G/5G/6G network), the components of IMS server (such as S-CSCF, I-CSCF module) may also include components/modules that pertain to functions, for example, a Breakout Gateway Control Function (BGCF) module 118, a Media Gateway Control Function (MGCF) module 122, an Interconnect Border Control Function (IBCF) 116 and other components/modules. In a general implementation, the BGCF module 118 may enable routing call signaling to and from the most appropriate S-CSCF module 158. In the present implementation, the BGCF module 118 may enable to route the call to respective BTAS 102 for mapping Session Initiation Protocol (SIP) response with an appropriate cause code. In general, the MGCF module 122 may be a SIP endpoint that can interface with Security Gateway (SGW) and may also control resources in Media Gateway (MGW) 130. The IBCF module 116 may enable boundary control between various service provider networks, thus providing BTAS enabled IMS network security in terms of signaling information. The IMS server 106 may also include other existing components such as for example a component pertaining to Multimedia Resource Function (MRF) module 126. The MRF module 126 in conjunction with other components of IMS, may be responsible for executing various processing tasks on media streams associated with particular services. Further, as shown in FIG. 1B, as the BTAS-IMS based implementation, may be associated with Point of Interconnection (POI) 134, which may be the physical interface between media gateways of varying service providers or enterprises.

In an embodiment, the BTAS 102 may receive a SIP response. Further, the BTAS 102 may determine a reason for an error in the call, and determine the cause code for the error. The BTAS 102 may map the SIP and appropriate cause code. Further, the BTAS 102 may provide, in the SIP response, an appropriate reason for the call failure or the call error. In an embodiment, a call may be sent to E-SBC 156, and the call may be routed from the E-SBC 156 to the P-CSCF 152. At step (3), the call may be routed from the P-CSCF 152 to the S-CSCF 158. At step (4), a query may be sent from the S-CSCF 158 to the DNC Server 104 regarding DNC registration of the B number. At step (5), the DNC Server 104 may answer if the B number is registered/Non-registered for DNC. At step (6), the call may be forwarded to the BTAS 102. At step (7), the query may be sent from the BTAS (102) to the MNP 124. At step (8), the MNP 124 may answer. At step (9), the BTAS 102 may route call to the S-CSCF 158. At step (10a) wireline calls to terminating BTAS 102. At step (10b) Voice over Long-Term Evolution (VOLTE) call to the TAS 160. At step (10c), offnet calls to MGCF 122 via the BGCF 118. At step (11), the offnet calls may be sent from the BGCF 118 to the MGCF 122. The BTAS 102 may facilitate mapping Session Initiation Protocol (SIP) response with an appropriate cause code, by a combination of hardware and software implementation.

Figure 2A:
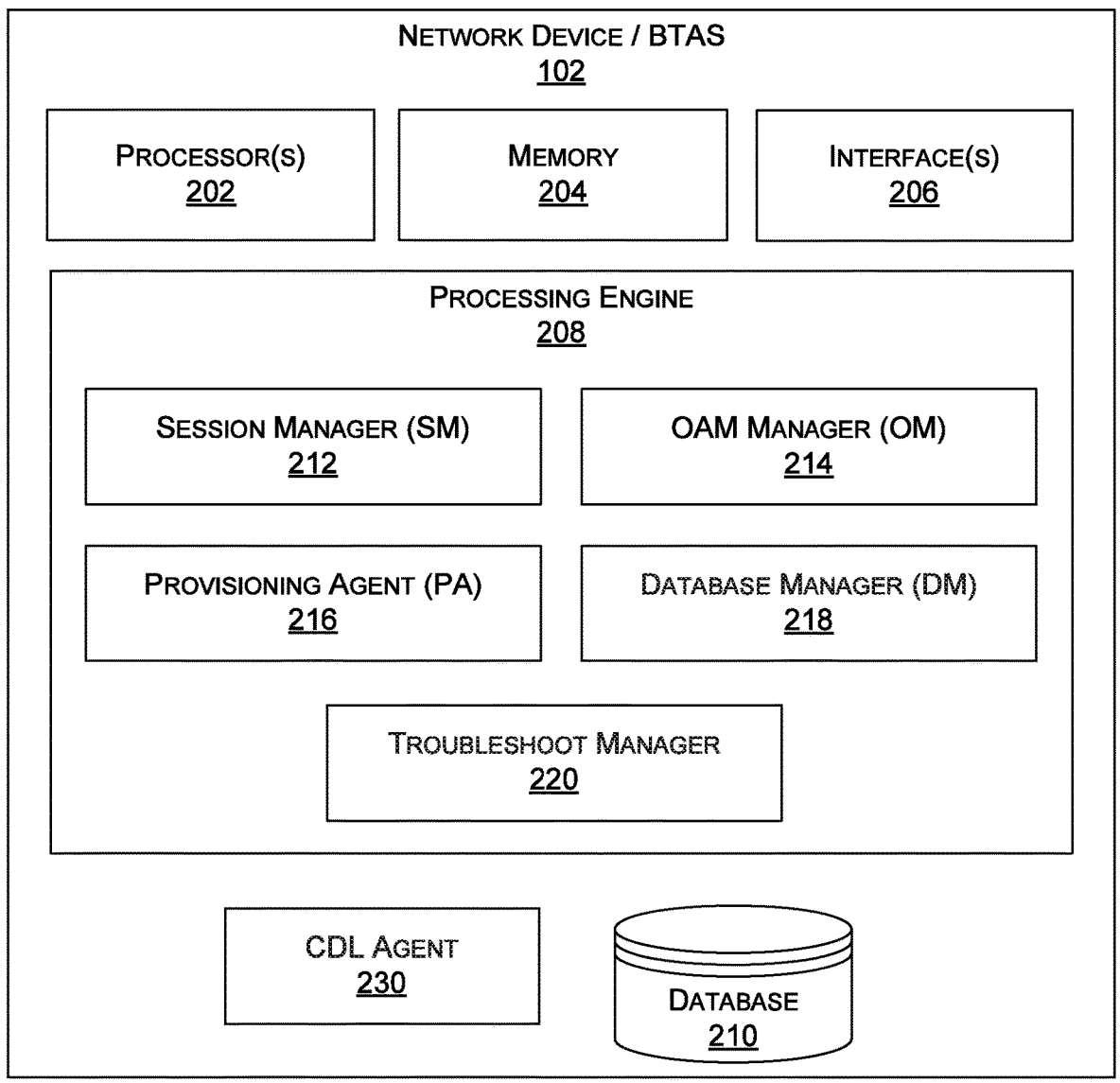
FIG. 2A illustrates an exemplary representation 200 of a network device or a Business Telephony Application Server (BTAS), in accordance with an embodiment of the present disclosure.

FIG. 2A with reference to FIG. 1A, illustrates an exemplary representation of the network device 102/BTAS 102, in accordance with an embodiment of the present disclosure. The system includes the network device 102 or BTAS 102 that may include one or more processors. The network device or BTAS 102 may be integrated with IMS server 106 to provide a network service to a user device 110 (as shown in FIG. 1A). In an aspect, the network device 102 may include one or more processor(s) 202 coupled with a memory 204. The memory 204 may store instructions which when executed by one or more processors may cause the system to perform the steps as described herein. The network device 102 or BTAS 102 may cause the system to receive, through the IMS (106 of FIG. 1A), a routed request. In an embodiment, the BTAS 102 may receive an extension/number dialed by a first user on a mobile/fixed-line. In an embodiment, the BTAS 102 may receive a SIP response. Further, the BTAS 102 may determine a reason for an error in the call, and determine the cause code for the error. The BTAS 102 may map the SIP and appropriate cause code. Further, the BTAS 102 may provide, in the SIP response, an appropriate reason for the call failure or the call error.

The one or more processor(s) 202 may be implemented as one or more microprocessors, microcomputers, microcontrollers, digital signal processors, central processing units, logic circuitries, and/or any devices that process data based on operational instructions. Among other capabilities, the one or more processor(s) 202 may be configured to fetch and execute computer-readable instructions stored in a memory 204 of the BTAS 102. The memory 204 may be configured to store one or more computer-readable instructions or routines in a non-transitory computer-readable storage medium, which may be fetched and executed to create or share data packets over a network service. The memory 204 may comprise any non-transitory storage device including, for example, volatile memory such as RAM, or non-volatile memory such as EPROM, flash memory, and the like.

In an embodiment, the BTAS 102 may include an interface(s) 206. The interface(s) 206 may comprise a variety of interfaces, for example, interfaces for data input and output devices, referred to as I/O devices, storage devices, and the like. The interface(s) 206 may facilitate communication of the BTAS 102. The interface(s) 206 may also provide a communication pathway for one or more components of the BTAS 102. Examples of such components include, but are not limited to, processing engine(s) 208 and a database 210.

The processing engine(s) 208 may be implemented as a combination of hardware and programming (for example, programmable instructions) to implement one or more functionalities of the processing engine(s) 208. In the examples described herein, such combinations of hardware and programming may be implemented in several different ways. For example, the programming for the processing engine(s) 208 may be processor-executable instructions stored on a non-transitory machine-readable storage medium, and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the BTAS 102 may comprise the machine-readable storage medium storing the instructions and the processing resource to execute the instructions, or the machine-readable storage medium may be separate but accessible to the BTAS 102 and the processing resource. In other examples, the processing engine(s) 208 may be implemented by electronic circuitry.

The processing engine 208 of the network device may include one or more components (as shown in FIG. 2A) including a Session Manager (SM) 212, an Operations and Maintenance (OAM) manager 214, a provisioning agent 216, a Database Manager (DM) 218, and a Troubleshooting Manager (TM) 220. The SM 212 may act as a core functional delivery module that may be responsible for call processing and service chaining logic execution in the case of BTAS 102. The SM 212 may further include one or more sub-modules such as the call initiation module (not shown)

for initiating a communication with the plurality of emergency services. The OAM manager 214 may be configured for managing fault, configuration, and performance aspects of the BTAS/network device 102. The OAM manager 214 may provide operations and maintenance touchpoints to the system or the BTAS 102. The DM 218 may manage database clusters whereas BTAS 102 may store subscriber-specific service information. In an embodiment, a service data modification request that may be received by the provisioning agent 216 may be stored persistently using DM manager 218. The provisioning agent 218 may be responsible for handling provisioning requests received from the centralized provisioning server for persisting changes in database 210. The provisioning agent may also ensure that various session managers 212 may be updated about any dynamic changes in the service data. The TM 220 may aggregate logs and may debug information from all the functional managers for troubleshooting. The TM 220 may also provide flexibility to generate debug information, for example, in a module-wise, process-wise, system-wise manner. Various other functions of the components may be possible. In an embodiment, database 210 may comprise data that may be either stored or generated as a result of functionalities implemented by any of the components of the processing engine(s) 208 of the BTAS 102.

In an embodiment, the processor 202 may receive, in response to a Session Initiation Protocol (SIP) request message, and a SIP response message. The SIP response message may correspond to at least one of a provisional SIP response message and a final SIP response message. The processor 202 may determine at least one of a pre-defined cause code in a reason header field associated with at least one of the provisional SIP response message and the final SIP response message, and an error response code in a reason header field associated with the final SIP response message. The processor 202 may in response to determining the pre-defined cause code in the final SIP response message, modify the pre-defined cause code in the reason header field associated with the final SIP response message based on the pre-defined cause code in the reason header field associated with the provisional SIP response message. The processor 202 may in response to determining the error response code in the final SIP response message, modify the error response code in the reason header field associated with the final SIP response message, based on the pre-defined cause code in the reason header field associated with the provisional SIP response message. The processor 202 may map the pre-defined cause code in the final SIP response message with a corresponding SIP response code. The processor 202 may output the final SIP response message with the mapped SIP response code and a reason message associated with the SIP response code.

In an embodiment, for determining the at least one of the pre-defined cause code, the processor 202 may replicate the pre-defined cause code from the reason header field associated with the provisional SIP response message when the pre-defined cause code is present in the provisional SIP response message and the pre-defined cause code is not present in the final SIP response message. Further, the processor 202 may replicate the pre-defined cause code in the reason header field associated with the final SIP response message, when the pre-defined cause code is present in the provisional SIP response message and the pre-defined cause code is not present in the final SIP response message. The processor 202 may modify the error response code in the reason header field associated with the final SIP response message, based on the pre-defined cause code in the reason header field associated with the final SIP response message.

In an embodiment, for determining the at least one of the pre-defined cause code in the reason header field associated with at least one of the provisional SIP response message and the final SIP response message, the processor 202 may modify the error response code in the reason header field associated with the final SIP response message. The modification in the error response code may be based on the pre-defined cause code in the reason header field associated with the final SIP response message, when the pre-defined cause code is not present in the provisional SIP response message and the pre-defined cause code is present in the final SIP response message.

In an embodiment, for determining the at least one of the pre-defined cause code in the reason header field associated with at least one of the provisional SIP response message and the final SIP response message may, the processor 202 may insert the pre-defined cause code in the reason header field associated with the final SIP response message. The insertion of the pre-defined cause code may be based on the error response code received in the reason header field associated with the final SIP response message, when the pre-defined cause code is not present in the provisional SIP response message and the final SIP response message.

In an embodiment, the processor 202 may be configured to transmit the call from the out-dialer service to a Do Not Call (DNC) server communicatively coupled to the BTAS. The processor 202 may receive a status message, if a number associated with the call is not listed in a Do Not Disturb (DND) database, wherein the call is terminated at the DNC server, if the number associated with the call is listed in the DND database. The processor 202 may receive a routed call from the DNC server to BTAS 102 for mapping the SIP response code with the cause code.

Figure 2B:
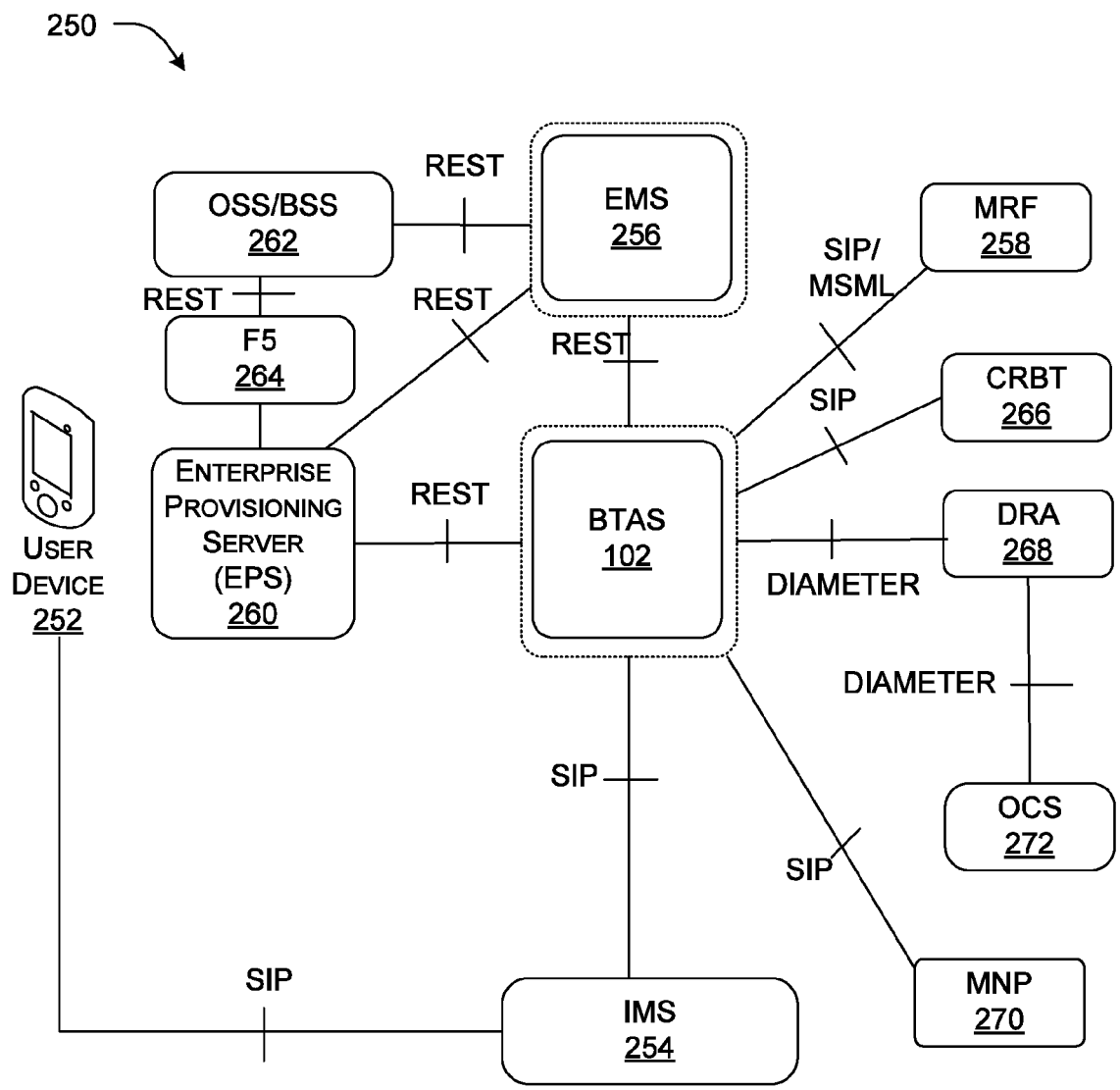
FIG. 2B illustrates an exemplary representation 250 of flow diagrams showing integration architecture of network device or a Business Telephony Application Server (BTAS), in accordance with embodiments of the present disclosure.

FIG. 2B illustrates an exemplary representation of flow diagrams showing integration architecture of network device or BTAS 102, in accordance with embodiments of the present disclosure. As shown in FIG. 2B, the BTAS 102 may be integrated or coupled with various hardware/software components or servers for enabling one or more functions pertaining to SIP Vs cause code mapping. The BTAS 102 may be integrated with the IMS server 254 to enable the communication processing pertaining to a user device within an enterprise (154—as shown in FIG. 1B). In an example embodiment, the BTAS 102 may be integrated with IMS server 106 to establish and control communication connections via network protocol including, but not limited to, Session Initiation Protocol (SIP). As the communication may also involve the use of media in one or more forms, the BTAS 102 may integrate with Multimedia Resource Function (MRF) 258. The BTAS 102 may interface with Enterprise Provisioning Server (EPS) 260 via representational state transfer (REST) protocol to enable provisioning of service data.

In an example embodiment, the BTAS 102 may integrate with MRF 258 to enable functions, such as, for example, media mixing, control of announcement, and other such purposes via network protocol including, but not limited to, Session Initiation Protocol Media Server Markup Language (SIP-MSML). In an example embodiment, the BTAS 102 may be integrated or coupled with other components/services such as Mobile Number Portability (MNP) 124 (via SIP) for enabling number portability dipping. In another example embodiment, the BTAS 102 and the EPS 260 may be independently integrated or coupled with Element Management System (EMS) 256 via REST. The EMS 256 may include hardware and software implementation for managing the five key aspects i.e., Fault, Configuration, Accounting, Performance and Security (FCAPS) functionality via representational state transfer (REST) protocol to exchange messages pertaining to the key aspects that can use hypertext transfer protocol (HTTP) to transport the messages. The EMS may provide a foundation to implement an Operations Support System (OSS) or Business Support Systems (BSS) 262 based architecture that enables service providers to meet customer needs for example, for rapid deployment of services, to enable providing a satisfying quality of service requirements and other such services. The EMS 256 may interface with OSS/BSS 262 via REST protocol to enable a northbound interface for FCAPS data of BTAS 102/EPS 260. The term northbound interface may relate to an interface that allows a particular component of a network to communicate with a higher-level component. The OSS/BSS 262 may interface with EPS 260 via REST protocol to enable functions such as, for example, service data management requests.

Further, as shown in FIG. 2B, the BTAS 102 may be integrated or coupled with Diameter Routing Agent (DRA) 268 via diameter protocol, which may be a standard protocol for authentication, authorization, and accounting information in the IMS server-based network. The DRA Diameter may be a functional element that may provide real-time routing capabilities to ensure that messages are routed among the correct elements in a network. The integration of BTAS 102 with the DRA 268 may enable integration with an online charging system (OCS) 272 for facilitating Ro charging. The OCS may be a system that allows a service provider to charge users or customers in real-time based on service usage, and wherein the Ro-charging pertains to a protocol that enables trigger to generate charging events. In an embodiment, the BTAS 102 may also be integrated with components pertaining to Customized Caller Ring Back Tone (CRBT) 266 for enabling personalized Ring Back Tone (RBT) at the stage of establishing the communication. For example, this may be mainly related to the ring-back tone that may be played while connecting a call communication of the user device with the plurality of emergency services.

Figure 3:
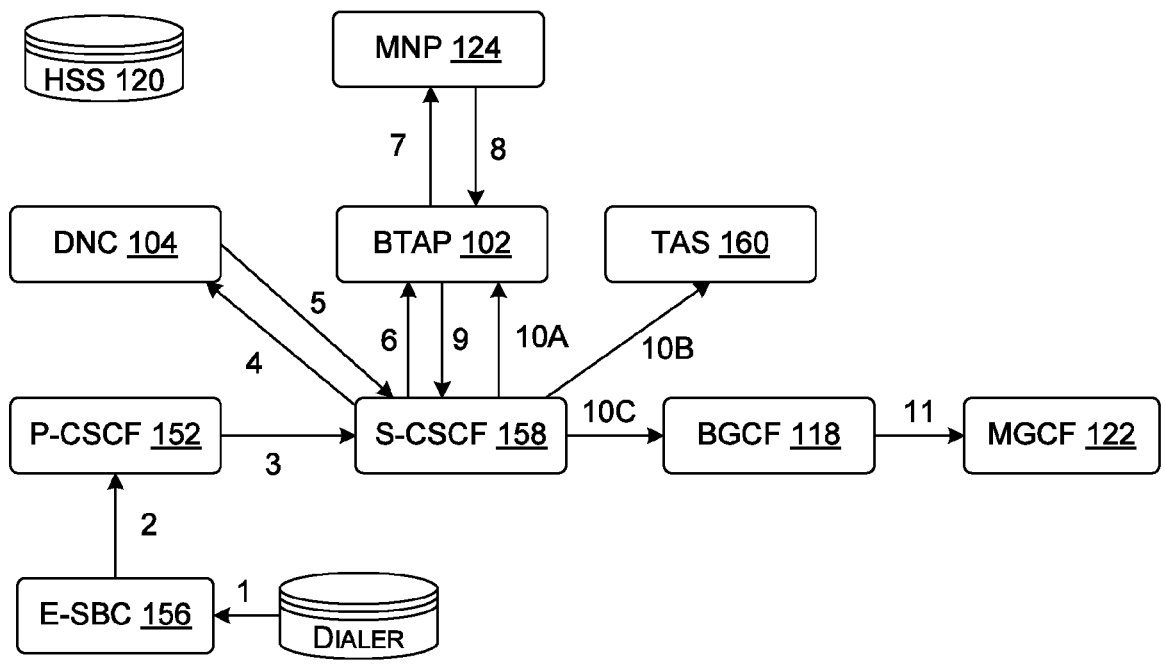
FIG. 3 illustrates an exemplary flow diagram representation 300 of a call flow for an out dialer of an automated advertisement call Service supported by the BTAS with help of an Internet protocol Multimedia Subsystem (IMS), in accordance with an embodiment of the present disclosure.

FIG. 3 illustrates an exemplary flow diagram representation of a call flow for an out dialer of an automated advertisement call Service supported by the BTAS 102 with help of an Internet protocol Multimedia Subsystem (IMS), in accordance with an embodiment of the present disclosure.

In an instance, operator contact center team may run telemarketing campaigns over telecommunication operator provided Session Initiation Protocol (SIP) trunk for which, the operator contact center team may need to derive analytical data based on the combination of SIP final error cause code and pre-defined cause codes. Based on the analytical data, the operator contact center team may derive a re-dial strategy to improve on success ratio of telemarketing. Consider, a high-level network setup as shown in FIG. 3, an out dialer may be an automated advertisement call service supported by the BTAS 102 with help of IMS 106. Major network elements involved in FIG. 3 may be out dialer, E-SBC 156, P-CSCF 152, HSS 120, S-CSCF 158, DNC 104, BTAS 102, TAS 160, BGCF 118, and MGCF 122. In this, Call Dialing Server such as an automatic call distributors (ACDs) may be integrated with E-SBC 156, at access side. The BTAS 102 uses SIP trunk infrastructure to support the out dialer service. The additional Network Element (NE) in the call flow may be the introduction of DNC server 104 to verify the B number DND activation status. When call is received from an out dialer, the call may be sent to DNC server 104 first being first priority under Initial Filter Criteria (IFC). The DNC server 104 may return "301" message if the B-Number is not listed in the database and call may be routed to BTAS 102 for further analysis. The DNC server 104 may return "480" message, if the B Number registered in the database and call may be terminated.

At step (1), an out-dialer call may be sent to E-SBC 156. At step (2), a call may be routed from the E-SBC 156 to the P-CSCF 152. At step (3), the call may be routed from the P-CSCF 152 to the S-CSCF 158. At step (4), a query may be sent from the S-CSCF 158 to the DNC Server 104 regarding DNC registration of the B number. At step (5), the DNC Server 104 may answer if the B number is registered/Non-registered for DNC. At step (6), the call may be forwarded to the BTAS 102. At step (7), the query may be sent from the BTAS (102) to the MNP 124. At step (8), the MNP 124 may answer. At step (9), the BTAS 102 may route call to the S-CSCF 158. At step (10a) wireline calls to terminating BTAS 102. At step (10b) Voice over Long-Term Evolution (VOLTE) call to the TAS 160. At step (10c), offnet calls to MGCF 122 via the BGCF 118. At step (11), the offnet calls may be sent from the BGCF 118 to the MGCF 122.

Exemplary Scenario

Consider an exemplary scenario, where 140 telemarketing service being hosted over the BTAS 102. The BTAS 102 via the SIP response message may receive pre-defined cause code values in 18X section, to be put in final error responses as per customer's requirement. Also, the final SIP error responses may also need to be changed as per customer's requirement. For the genuine case where user did not answer the call and sending 5xx (instead of 480) with cause-code 18, the BTAS 102 may lookup cause-code vs sip mapping and the BTAS 102 may modify the response code to 480. Likewise, the BTAS 102 can also change the cause-code received in reason header based on SIP vs cause-code mapping wherever it is required. This feature may be flexible at ENT level so that, the SIP vs cause code mapping can be enabled only for the customers where it is required.

In general, cause code mapping that would be followed is as follows:

The user behavior to cause code mapping is responsibility of the terminating exchange. BTAS 102 may only map the cause codes or correct the SIP responses based on the Table 1 below:

Please note that Q850 cause code may be considered to be at highest priority if received in 18X compare to Final response.

TABLE 1

| Pre-defined cause code | Reason | SIP response | Reason |
|---|---|---|---|
| 1 | unallocated number | 404 | Not Found |
| 2 | no route to network | 404 | Not found |
| 3 | no route to destination | 404 | Not found |
| 16 | normal call clearing | — | (*) |
| 17 | user busy | 486 | Busy here |
| 18 | no user responding | 408 | Request Timeout |
| 19 | no answer from the user | 480 | Temporarily unavailable |
| 20 | subscriber absent | 480 | Temporarily unavailable |

TABLE 1-continued

| Pre-defined cause code | Reason | SIP response | Reason |
|---|---|---|---|
| 21 | call rejected | 403 | Forbidden (+) |
| 22 | number changed (w/o diagnostic) | 410 | Gone |
| 22 | number changed (w/ diagnostic) | 301 | Moved Permanently |
| 23 | redirection to new destination | 410 | Gone |
| 26 | non-selected user clearing | 404 | Not Found (=) |
| 27 | destination out of order | 502 | Bad Gateway |
| 28 | address incomplete | 484 | Address incomplete |
| 29 | facility rejected | 501 | Not implemented |
| 31 | normal unspecified | 480 | Temporarily unavailable |
| 34 | no circuit available | 503 | Service unavailable |
| 38 | network out of order | 503 | Service unavailable |
| 41 | temporary failure | 503 | Service unavailable |
| 42 | switching equipment congestion | 503 | Service unavailable |
| 47 | resource unavailable | 503 | Service unavailable |
| 55 | incoming calls barred within CUG | 403 | Forbidden |
| 57 | bearer capability not authorized | 403 | Forbidden |
| 58 | bearer capability not presently available | 503 | Service unavailable |
| 65 | bearer capability not implemented | 488 | Not Acceptable Here |
| 70 | only restricted digital avail | 488 | Not Acceptable Here |
| 79 | service or option not implemented | 501 | Not implemented |
| 87 | user not member of CUG | 403 | Forbidden |
| 88 | incompatible destination | 503 | Service unavailable |
| 102 | recovery of timer expiry | 504 | Gateway timeout |
| 111 | protocol error | 500 | Server internal error |
| 127 | interworking unspecified | 500 | Server internal error |

An expected output for the SIP and cause code mapping from the BTAS 102 may be shown in Table 2 below.

TABLE 2

| Sr. No. | 18x -Q850 | ReceivedFinal-Q850 | Action needed by BTAS 102 |
|---|---|---|---|
| 1 | Available | X | 1. Copy the pre-defined cause code from 18X to Final Error Response. 2. Modify final sip Error response According to copied pre-defined cause code value as per Cause code mapping spreadsheet |
| 2 | Not Available | Available | 1. Modify final sip Error response According to Available pre-defined cause code value as per cause code mapping spreadsheet |
| 3 | Not Available | Not Available | 1. Add pre-defined cause code Reason as per final SIP error Response Received |

Figure 4:
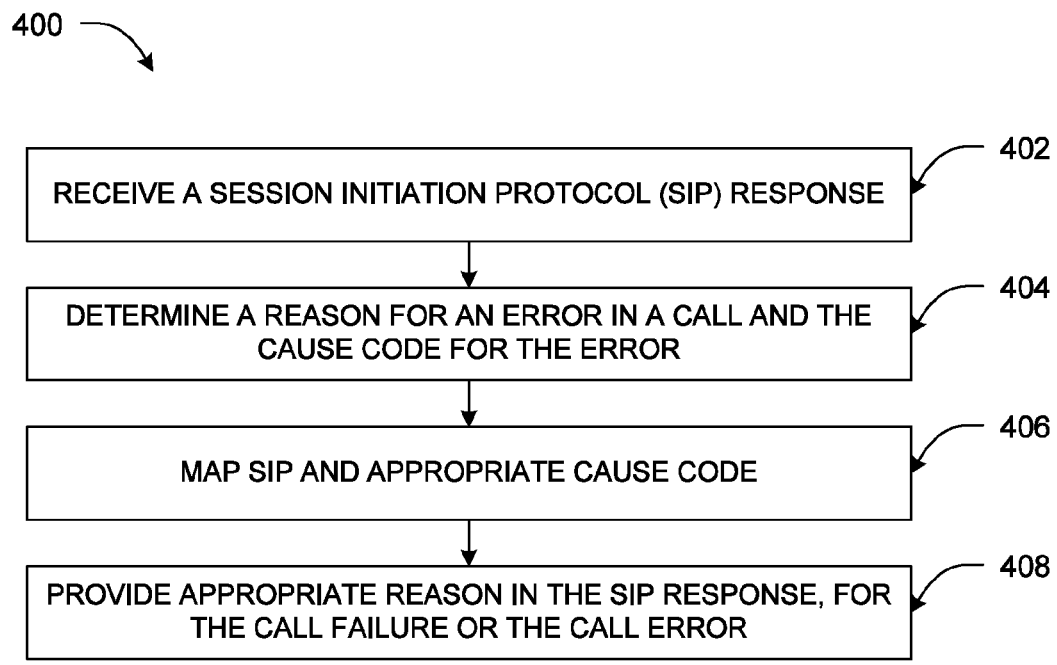
FIG. 4 illustrates an exemplary flow chart 400 for a method of mapping session initiation protocol response with an appropriate cause code, in accordance with an embodiment of the present disclosure.

FIG. 4 illustrates an exemplary flow chart for a method 400 of mapping session initiation protocol response with an appropriate cause code, in accordance with an embodiment of the present disclosure.

At block (402), the method (400) may include receiving, by the processor (202) associated with a Business Telephony Application Server (BTAS) (102), a SIP response.

At block (404), the method (400) may include determining, by the processor (202), a reason for an error in the call and the cause code for the error.

At block (406) the method (400) may include map, by the processor (202), the SIP and appropriate cause code.

At block (408), the method (400) may include provide, by the processor (202), in the SIP response, an appropriate reason for the call failure or the call error.

Figure 5:
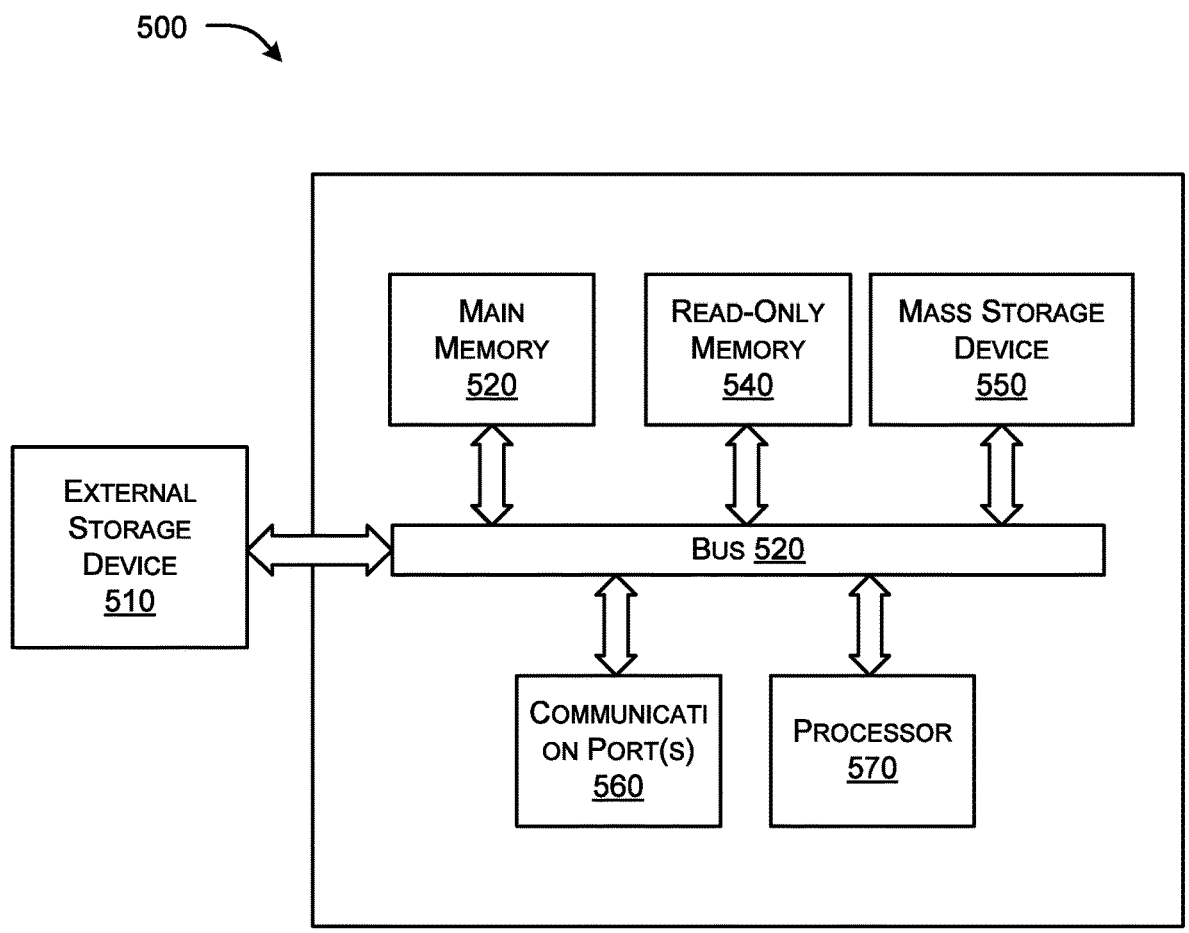
FIG. 5 illustrates an exemplary computer system 500 in which or with which embodiments of the present disclosure can be utilized, in accordance with embodiments of the present disclosure.

FIG. 5 illustrates an exemplary computer system (500) in which or with which embodiments of the present invention can be utilized, in accordance with embodiments of the present disclosure.

As shown in FIG. 5, the computer system 500 may include an external storage device 510, a bus 520, a main memory 530, a read-only memory 540, a mass storage device 550, a communication port(s) 560, and a processor 570. A person skilled in the art will appreciate that the computer system 500 may include more than one processor and communication port(s). The communication port 560 may be chosen depending on a network, such as a Local Area Network (LAN), Wide Area Network (WAN), or any network to which the computer system 500 connects. The main memory 530 may be Random Access Memory (RAM), or any other dynamic storage device commonly known in the art. The read-only memory 540 may be any static storage device(s) e.g., but not limited to, a Programmable Read Only Memory (PROM) chip for storing static information e.g., start-up or basic input/output system (BIOS) instructions for the processor 570. The mass storage device 550 may be any current or future mass storage solution, which can be used to store information and/or instructions.

The bus 520 may communicatively couple the processor(s) 570 with the other memory, storage, and communication blocks. Optionally, operator and administrative interfaces, e.g., a display, keyboard, and cursor control device may also be coupled to the bus 520 to support direct operator interaction with the computer system 500. Other operator and administrative interfaces can be provided through network connections connected through the communication port 560. In no way should the aforementioned exemplary computer system (500) limit the scope of the present disclosure.

Various embodiments of the present disclosure provide systems and methods for mapping Session Initiation Protocol (SIP) response with an appropriate cause code. The present disclosure provides systems and methods for changing a cause-code received in SIP reason header based on SIP Vs cause-code mapping, wherever it is required. The present disclosure allows to modify final SIP error responses as per user's requirement. The present disclosure avoids final error responses containing a dummy cause values corresponding to normal unspecified terminations. The present disclosure helps in deriving analytical data based on the combination of SIP final error cause code and pre-defined cause codes. Based on the analytical data, the user derives a call re-dial strategy to improve on success ratio.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter is to be implemented merely as illustrative of the disclosure and not as a limitation.

Advantages of the Invention

The present disclosure provides a system and method for mapping Session Initiation Protocol (SIP) response with an appropriate cause code.

The present disclosure provides a system and a method for changing a cause-code received in SIP reason header based on SIP Vs cause-code mapping, wherever it is required.

The present disclosure provides a system and a method to modify final SIP error responses as per user's requirement.

The present disclosure provides a system and method to avoid final error responses containing a dummy cause values corresponding to normal unspecified terminations.

The present disclosure provides a system and a method to help in deriving analytical data based on the combination of a SIP final error cause code and pre-defined cause codes. Based on the analytical data, the user derives a call re-dial strategy to improve on success ratio.

We claim:

1. A system for mapping a Session Initiation Protocol (SIP) response code with a cause code, the system comprising:
  a Business Telephony Application Server (BTAS) (102), the BTAS (102) comprising:
    a processor (202); and
    a memory (204) coupled to the processor (202), wherein the memory (204) comprises processor-executable instructions, which on execution, cause the processor (202) to:
      receive, in response to a SIP request message, a SIP response message, wherein the SIP response message corresponds to at least one of a provisional SIP response message and a final SIP response message;
      determine at least one of a pre-defined cause code in a reason header field associated with said at least one of the provisional SIP response message and the final SIP response message, and an error response code in a reason header field associated with the final SIP response message;
      in response to the determination of the pre-defined cause code in the final SIP response message, modify the pre-defined cause code in the reason header field associated with the final SIP response message based on the pre-defined cause code in the reason header field associated with the provisional SIP response message;
      in response to the determination of the error response code in the final SIP response message, modify the error response code in the reason header field associated with the final SIP response message based on the pre-defined cause code in the reason header field associated with the provisional SIP response message;
      map the pre-defined cause code in the final SIP response message with a corresponding SIP response code; and
      provide the final SIP response message with the mapped SIP response code and a reason message associated with the SIP response code.

2. The system as claimed in claim 1, wherein the pre-defined cause code is a Q.850 cause code in the reason header field associated with said at least one of the provisional SIP response message and the final SIP response message.

3. The system as claimed in claim 1, wherein to determine the at least one of the pre-defined cause code in the reason header field associated with said at least one of the provisional SIP response message and the final SIP response message, the processor (202) is configured to:
  replicate the pre-defined cause code from the reason header field associated with the provisional SIP response message in the reason header field associated with the final SIP response message based on the pre-defined cause code being present in the provisional SIP response message and the pre-defined cause code not being present in the final SIP response message; and
  modify the error response code in the reason header field associated with the final SIP response message based on the pre-defined cause code in the reason header field associated with the final SIP response message.

4. The system as claimed in claim 1, wherein to determine the at least one of the pre-defined cause code in the reason header field associated with said at least one of the provisional SIP response message and the final SIP response message, the processor (202) is configured to:
  modify the error response code in the reason header field associated with the final SIP response message based on the pre-defined cause code in the reason header field associated with the final SIP response message when pre-defined cause code is not present in the provisional SIP response message and the pre-defined cause code is present in the final SIP response message.

5. The system as claimed in claim 1, wherein to determine the at least one of the pre-defined cause code in the reason header field associated with said at least one of the provisional SIP response message and the final SIP response message, the processor (202) is configured to:
  insert the pre-defined cause code in the reason header field associated with the final SIP response message based on the error response code received in the reason header field associated with the final SIP response message, when the pre-defined cause code is not present in the provisional SIP response message and the final SIP response message.

6. The system as claimed in claim 1, wherein the BTAS (102) comprises an SIP trunk infrastructure to support an out dialer service for a call associated with the SIP request message.

7. The system as claimed in claim 5, wherein the processor (202) is configured to:
  transmit the call from the outdialer service to a Do Not Call (DNC) server communicatively coupled to the BTAS (102);
  receive a status message based on a number associated with the call not being listed in a Do Not Disturb (DND) database, wherein the call is terminated at the DNC server based on the number associated with the call being listed in the DND database; and
  receive a routed call from the DNC server to the BTAS (102) for mapping the SIP response code with the cause code.

8. The system as claimed in claim 1, wherein the pre-defined cause code corresponds to at least one of: an Integrated Services Digital Network (ISDN) User Part (ISUP) cause value, and a failure-related cause value.

9. The system as claimed in claim 1, wherein mapping of the pre-defined cause code in the final SIP response message with the corresponding SIP response code is based on a pre-defined cause code-SIP response code mapping table.

10. A method for mapping a Session Initiation Protocol (SIP) response code with a cause code, the method comprising:
  receiving, by a processor (202) associated with a Business Telephony Application Server (BTAS) (102), in response to a SIP request message, a SIP response message, wherein the SIP response message corresponds to at least one of a provisional SIP response message and a final SIP response message;

determining, by the processor (202), at least one of a pre-defined cause code in a reason header field associated with at least one of the provisional SIP response message and the final SIP response message, and an error response code in a reason header field associated with the final SIP response message;

in response to determining the pre-defined cause code in the final SIP response message, modifying, by the processor (202), the pre-defined cause code in the reason header field associated with the final SIP response message based on the pre-defined cause code in the reason header field associated with the provisional SIP response message;

in response to determining the error response code in the final SIP response message, modifying, by the processor (202), the error response code in the reason header field associated with the final SIP response message, based on the pre-defined cause code in the reason header field associated with the provisional SIP response message;

mapping, by the processor (202), the pre-defined cause code in the final SIP response message with a corresponding SIP response code; and providing, by the processor (202), the final SIP response message with the mapped SIP response code and a reason message associated with the SIP response code.

11. The method as claimed in claim 10, wherein the pre-defined cause code is a Q.850 cause codein the reason header field associated with said at least one of the provisional SIP response message and the final SIP response message.

12. The method as claimed in claim 10, wherein determining the at least one of the pre-defined cause code in the reason header field associated with said at least one of the provisional SIP response message and the final SIP response message comprises:

replicating, by the processor (202), the pre-defined cause code from the reason header field associated with the provisional SIP response message in the reason header field associated with the final SIP response message based on the pre-defined cause code being present in the provisional SIP response message and the pre-defined cause code not being present in the final SIP response message; and modifying, by the processor (202), the error response code in the reason header field associated with the final SIP response message based on the pre-defined cause code in the reason header field associated with the final SIP response message.

13. The method as claimed in claim 10, wherein determining the at least one of the pre-defined cause code in the reason header field associated with said at least one of the provisional SIP response message and the final SIP response message, the method comprises:

modifying, by the processor (202), the error response code in the reason header field associated with the final SIP response message based on the pre-defined cause code in the reason header field associated with the final SIP response message, when the pre-defined cause code is not present in the provisional SIP response message and the pre-defined cause code is present in the final SIP response message.

14. The method as claimed in claim 10, wherein determining the at least one of the pre-defined cause code in the reason header field associated with said at least one of the provisional SIP response message and the final SIP response message, the method comprises:

inserting, by the processor (202), the pre-defined cause code in the reason header field associated with the final SIP response message based on the error response code received in the reason header field associated with the final SIP response message, when the pre-defined cause code is not present in the provisional SIP response message and the final SIP response message.

15. The method as claimed in claim 10, wherein the BTAS (102) comprises an SIP trunk infrastructure to support an out dialer service for a call associated with the SIP request message.

16. The method as claimed in claim 15, comprising:

transmitting, by the processor (202), the call from the outdialer service to a Do Not Call (DNC) server communicatively coupled to the BTAS (102);

receiving, by the processor (202), a status message based on a number associated with the call not being listed in a Do Not Disturb (DND) database, wherein the call is terminated at the DNC server based on the number associated with the call being listed in the DND database; and receiving, by the processor (202), a routed call from the DNC server to the BTAS for mapping the SIP response code with the cause code.

17. The method as claimed in claim 10, wherein the pre-defined cause code corresponds to at least one of: an Integrated Services Digital Network (ISDN) User Part (ISUP) cause value, and a failure-related cause value.

18. The method as claimed in claim 10, wherein mapping the pre-defined cause code in the final SIP response message with the corresponding SIP response code is based on a pre-defined cause code-SIP response code mapping table.

19. A User Equipment (UE) (110) for mapping a Session Initiation Protocol (SIP) response code with an appropriate cause code, the UE (110) comprising:

one or more processors coupled to a processor (202) of a Business Telephony Application Server (BTAS) (102), wherein the one or more processors are coupled to a memory, and wherein the memory stores executable instructions, which on execution, cause the UE (110) to:

transmit a SIP response message to the BTAS (102), wherein the one or more processors (202) are configured to:

receive, in response to a SIP request message, the SIP response message from the UE (110), wherein the SIP response message corresponds to at least one of a provisional SIP response message and a final SIP response message;

determine at least one of a pre-defined cause code in a reason header field associated with said at least one of the provisional SIP response message and the final SIP response message, and an error response code in a reason header field associated with the final SIP response message;

in response to the determination of the pre-defined cause code in the final SIP response message, modify the pre-defined cause code in the reason header field associated with the final SIP response message based on the pre-defined cause code in the reason header field associated with the provisional SIP response message;

in response to the determination of the error response code in the final SIP response message, modify the error response code in the reason header field associated with the final SIP response message, based on the pre-defined cause code in the reason header field associated with the provisional SIP response message;

map the pre-defined cause code in the final SIP response message with a corresponding SIP response code; and provide the final SIP response message with the mapped SIP response code and a reason message associated with the SIP response code.

20. A non-transitory computer readable medium comprising a processor with executable instructions causing the processor to:

receive, in response to a Session Initiation Protocol (SIP) request message, a SIP response message, wherein the SIP response message corresponds to at least one of a provisional SIP response message and a final SIP response message;

determine at least one of a pre-defined cause code in a reason header field associated with said at least one of the provisional SIP response message and the final SIP response message, and an error response code in a reason header field associated with the final SIP response message;

in response to the determination of the pre-defined cause code in the final SIP response message, modify the pre-defined cause code in the reason header field associated with the final SIP response message based on the pre-defined cause code in the reason header field associated with the provisional SIP response message;

in response to the determination of the error response code in the final SIP response message, modify the error response code in the reason header field associated with the final SIP response message based on the pre-defined cause code in the reason header field associated with the provisional SIP response message;

map the pre-defined cause code in the final SIP response message with a corresponding SIP response code; and provide the final SIP response message with the mapped SIP response code and a reason message associated with the SIP response code.

* * * * *